(12) United States Patent  
Kim

(10) Patent No.: US 7,035,052 B2  
(45) Date of Patent: Apr. 25, 2006

(54) MAGNETIC HEAD PARKING APPARATUS USING DEFORMABLE MEMBER

(75) Inventor: Do-wan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 300 days.

(21) Appl. No.: 10/388,421

(22) Filed: Mar. 17, 2003

(65) Prior Publication Data

US 2003/0179502 A1    Sep. 25, 2003

(30) Foreign Application Priority Data

Mar. 25, 2002    (KR) ............................... 2002-16084

(51) Int. Cl.
*G11B 5/54* (2006.01)
*G11B 21/22* (2006.01)

(52) U.S. Cl. ................. 360/254.3; 360/254.4; 360/254.6

(58) Field of Classification Search ............ 360/254.3, 360/254.4, 254.5, 254.6, 255.2, 255.3, 255.4, 360/255.5
See application file for complete search history.

(56) References Cited

U.S. PATENT DOCUMENTS

| 4,605,979 | A | * | 8/1986 | Inoue et al. | 360/254.3 |
| 4,684,913 | A | * | 8/1987 | Yaeger | 360/254.3 |
| 5,023,737 | A | * | 6/1991 | Yaeger | 360/254.5 |
| 5,079,652 | A | * | 1/1992 | Ishida et al. | 360/254.3 |
| 5,307,224 | A | * | 4/1994 | Minase | 360/254.4 |
| 5,926,347 | A | * | 7/1999 | Kouhei et al. | 360/254.3 |

FOREIGN PATENT DOCUMENTS

| JP | 6005023 | 1/1994 |
| JP | 6060577 | 3/1994 |

OTHER PUBLICATIONS

"Thermo-Actuated Load/Unload Mechanism for a Two-Headed Arm Assembly With Negative Gram Load Suspension," IBM Technical Disclosure Bulletin, Nov. 1984, US, vol. 27, ISS. 6, pp. 3494-3495.*
"Load/Unload Disk File Mechanism Incorporating a Separate Raised Read/Write Head Landing Zone," IBM Technical Disclosure Bulletin, Oct. 1988, US, vol. 31, ISS. 5, pp. 96-98.*

* cited by examiner

*Primary Examiner*—Craig A. Renner
(74) *Attorney, Agent, or Firm*—Staas & Halsey LLP

(57) ABSTRACT

A magnetic head parking apparatus of a hard disk drive for parking a magnetic head installed on an actuator includes a deformation member reversibly deformable in a direction in which the magnetic head is separated from a disk by pressing one side of the actuator, and a deformation control unit controlling deformation of the deformation member such that during parking the magnetic head, the deformation member is deformed in the direction in which the magnetic head is separated from the disk. Thus, since the slider is parked in a state of being separated from the hard disk, damage to the magnetic head due to an impact can be reduced. Also, since an additional parking area is not needed to be made in the hard disk, more data space can be secured in the hard disk.

37 Claims, 8 Drawing Sheets

MAGNETIC HEAD PARKING APPARATUS USING DEFORMABLE MEMBER

CROSS-REFERENCE TO RELATED APPLICATIONS

This application claims the benefit of Korean Patent Application No. 2002-16084, filed Mar. 25, 2002, in the Korean Intellectual Property Office, the disclosure of which is incorporated herein by reference.

BACKGROUND OF THE INVENTION

1. Field of the Invention

The present invention relates to a magnetic head parking apparatus of a hard disk drive, and more particularly, to a magnetic head parking apparatus of a hard disk drive separating a magnetic head from a disk in a parking state.

2. Description of the Related Art

A typical hard disk drive, as shown in FIGS. 1A and 1B, includes a hard disk 20 storing predetermined information, and an actuator 30 supporting a slider 50 on which a magnetic head 51 is mounted, and rotating around a rotation shaft 34 provided on a base 10. The actuator 30 includes an arm 32 coupled to the rotation shaft 34 to be capable of pivoting, a suspension 31 installed at the arm 32 and supporting the slider 50 to be elastically biased in a direction in which the slider 50 closely contacts the hard disk 20, and a bobbin portion 33 around which a mobile coil 35 of a voice coil motor, which will be described later, is wound. The voice coil motor includes the mobile coil 35 wound around the bobbin portion 33 and a magnet 41 attached to a yoke 40 installed on the base 10 and generating a magnetic force. Since an electromagnetic force is generated by an interaction between the magnetic force generated by the magnet 41 and a current flowing through the mobile coil 35, the actuator 30 is rotated in a direction according to Flemming's left-hand rule. By controlling the electromagnetic force, the magnetic head 51 is moved to a desired position on the hard disk 20.

During a recording and reproduction work, the slider 50 having the magnetic head 51 mounted thereon receives an elastic force by the suspension 31 and a lift force generated due to a rotation of the hard disk 20. The slider 50 maintains a lifted state at a position where the elastic force and the lift force are balanced, and the magnetic head 51 performs the recording and reproduction work. However, when the hard disk 20 stops rotating, for example, as an electric power is turned off, since the lift force lifting the slider 50 disappears, the slider 50 should be out of a recording area 22 of the hard disk 20 before the magnetic head 51 collides with a surface of the hard disk 20, to prevent the recording area 22 from being damaged. For this purpose, a parking area 21 where the slider 50 is disposed in a parking state is provided at an inner circumference of the hard disk 20. That is, when the actuator 30 is rotated so that the slider 50 is moved over the parking area 21 before the hard disk 20 completely stops rotating, the slider 50 is accommodated in the park area 21 even when the hard disk 20 is stopped, so that the damage to the recording area 22 is prevented. Contrarily, when the hard disk 20 starts to rotate, the lift force is generated again so that the slider 50 is lifted from the parking area 21. The magnetic head 51 is moved to the recording area 22 by rotating the actuator 30. Recently, to facilitate lifting of the slider 50 by reducing a contact area between the slider 50 and the parking area 21 of the hard disk 20, a plurality of bumpers 21a each having a crater shape are formed in the parking area 21 as shown in FIG. 2.

A locking unit 60 is used for locking the actuator 30 so that the actuator 30 disposed in the parking area 21 is not moved. The locking unit 60 includes a magnetic member 62 installed at the yoke 40 and magnetized by the magnet 41, a damper 63 inserted in a coupling protrusion 64 provided at one end of the bobbin portion 33 of the actuator 30, and an iron piece 61 coupled to an end of the damper 63. Thus, when the slider 50 installed at the suspension 31 enters in the parking area 21 of the hard disk 20 as the actuator 30 pivots as shown in FIGS. 1A and 1B, the iron piece 61 is coupled to the magnetic member 62 so that a locking state is maintained.

In the above magnetic head parking mechanism, it is disadvantageous that, when the hard disk 20 restarts to rotate, the slider 50 receives an impact occurring due to a friction with the parking area 21 of the hard disk 20 which rotates until the slider 50 receives the lift force sufficient to be lifted. Furthermore, in a case in which the bumpers 21a are formed, the magnetic head 51 may directly collide with an upward protruding portion of each of the bumpers 21a.

To solve the above problem, a conventional parking apparatus has been suggested as shown in FIGS. 3 and 4. The conventional parking apparatus includes a ramp 70 installed at an outer circumference of the hard disk 20 so that a tip end portion of the suspension 31 supporting the slider 50 is disposed on the ramp 70 by rotating the actuator 30 when the hard disk 20 is stopped. However, such a mechanism is disadvantageous in that the ramp 70 needs to be designed very precisely so that the tip end portion of the suspension 31 can slide up along a slope surface 71 of the ramp 70. Also, since the suspension 31 repeatedly wbs the ramp 70, an abrasion problem happens. Further, to maintain the tip end portion of the suspension 31 to be disposed on the ramp 70 before the lift force generated by the rotation of the hard disk 20 disappears as shown in FIG. 4, the tip end of the ramp 70 necessarily intrudes into an area of the hard disk 20, e.g., the recording area 22 of the hard disk 20, so that a data space is relatively reduced.

In the meantime, Japanese Patent Publication Nos. Hei 6-60577 and Hei 6-5023 disclose an apparatus for parking a magnetic head installed at one end of a suspension outside a hard disk by elastically deforming a wire to be contracted or expanded by a control of current flowing through the wire so that the magnetic head does not contact a surface of the hard disk. In the apparatus, when the current is supplied to the wire connected to the suspension, the wire contracts and draws the suspension so that a slider is separated from the surface of the hard disk. In this state, an actuator is rotated toward an outside of the hard disk and, when a supply of the current is cut off, the suspension lies on a predetermined support body of the hard disk. In contrast, during an operation of the actuator, the current is supplied to the wire to draw the suspension in a direction to be separated from the surface of the hard disk and the suspension is moved above the hard disk to be lifted by a lift force. However, in the above structure, since the parking apparatus including the wire and a current supply line needs to be mounted on the actuator which transfers the magnetic head, a structure of the actuator is complicated, and a response speed during controlling a rotation of the actuator transferring the magnetic head may become slower. Also, since additional current is supplied to the wire to deform the suspension when the hard disk is operated or the magnetic head is parked, consumption of electrical power increases. Therefore, the parking apparatus is needed to use a new method to overcome the above disadvantages.

SUMMARY OF THE INVENTION

To solve the above and/or other problems, it is an aspect of the present invention to provide a magnetic head parking apparatus of a hard disk by which damage to the magnetic head or slider is reduced, and a parking and parking release operation is smoothly performed.

Additional aspects and advantages of the invention will be set forth in part in the description which follows and, in part, will be obvious from the description, or may be learned by practice of the invention.

To achieve the above and/or other aspects, a magnetic head parking apparatus of a hard disk drive for parking a magnetic head installed on an actuator includes a deformation member reversibly deformable in a direction in which the magnetic head is separated from a disk to press one side of the actuator, and a deformation control unit controlling deformation of the deformation member such that during parking the magnetic head in a parking area of the disk, the deformation member is deformed in a direction in which the magnetic head is separated from the disk.

BRIEF DESCRIPTION OF THE DRAWINGS

These and/or other aspects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figures 1A, 1B:
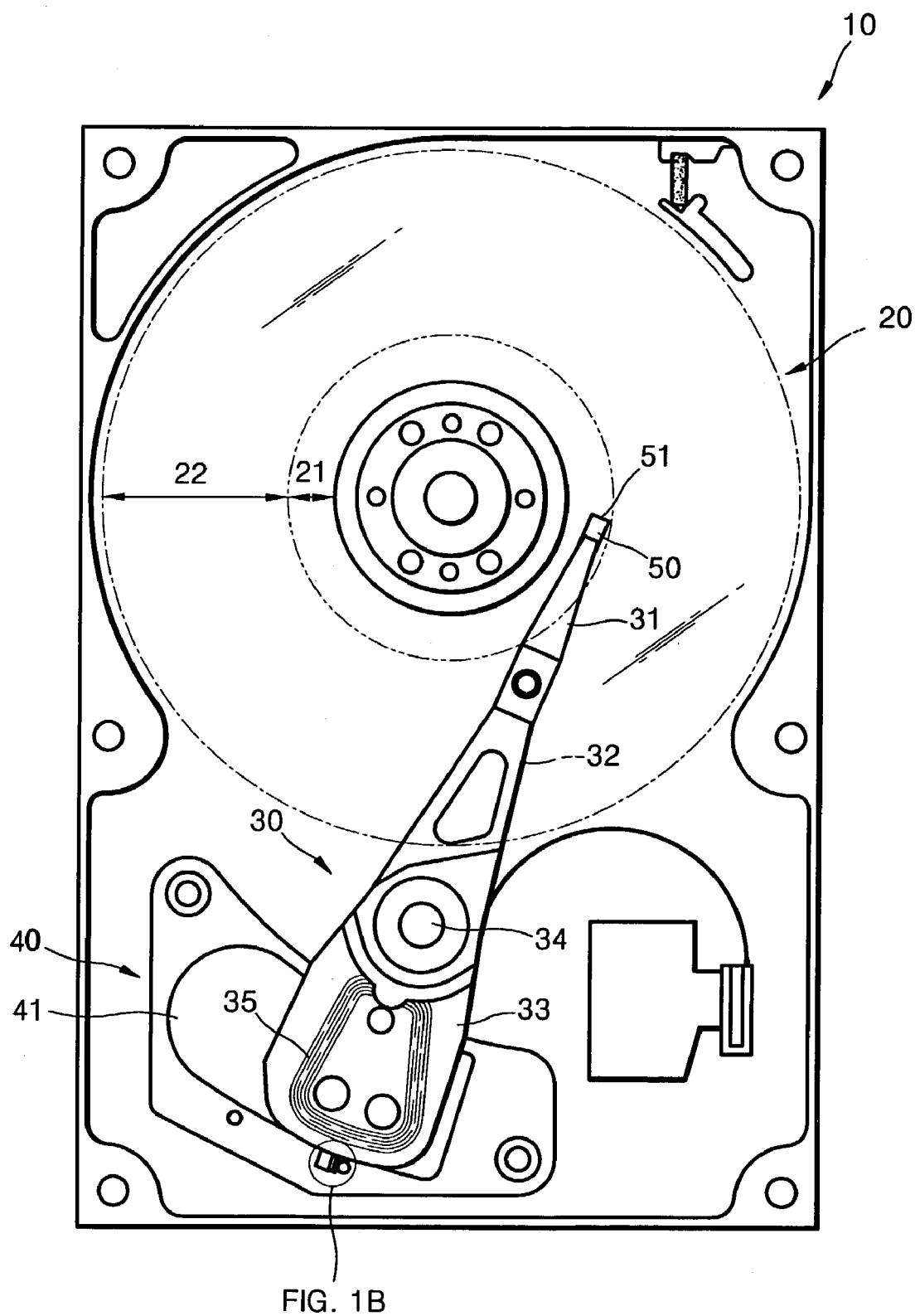
FIGS. 1A and 1B are views showing a hard disk drive adopting a conventional magnetic head parking apparatus.
Figure 1B:
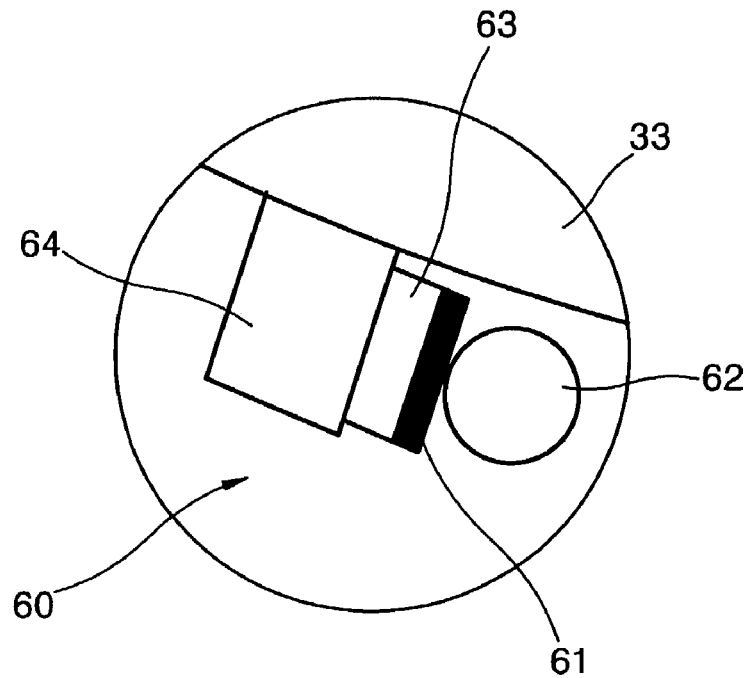
Figure 2:
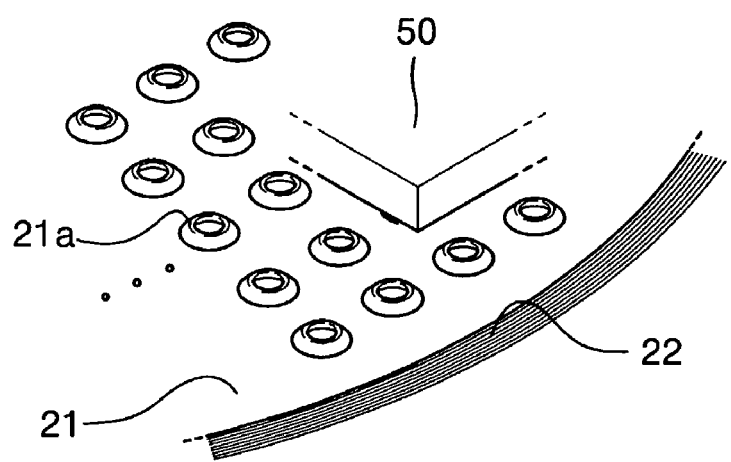
FIG. 2 is a view showing bumpers formed in the parking area of the hard disk drive shown in FIG. 1A.
Figure 3:
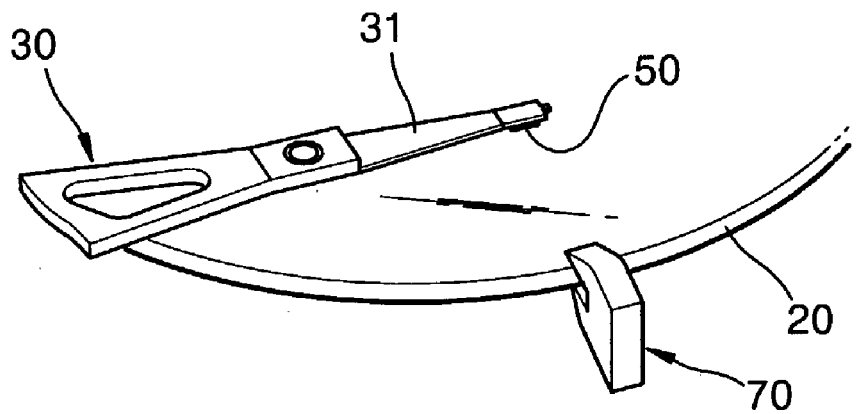
FIGS. 3 and 4 are views showing another conventional magnetic head parking apparatus.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figures 5A, 5B:
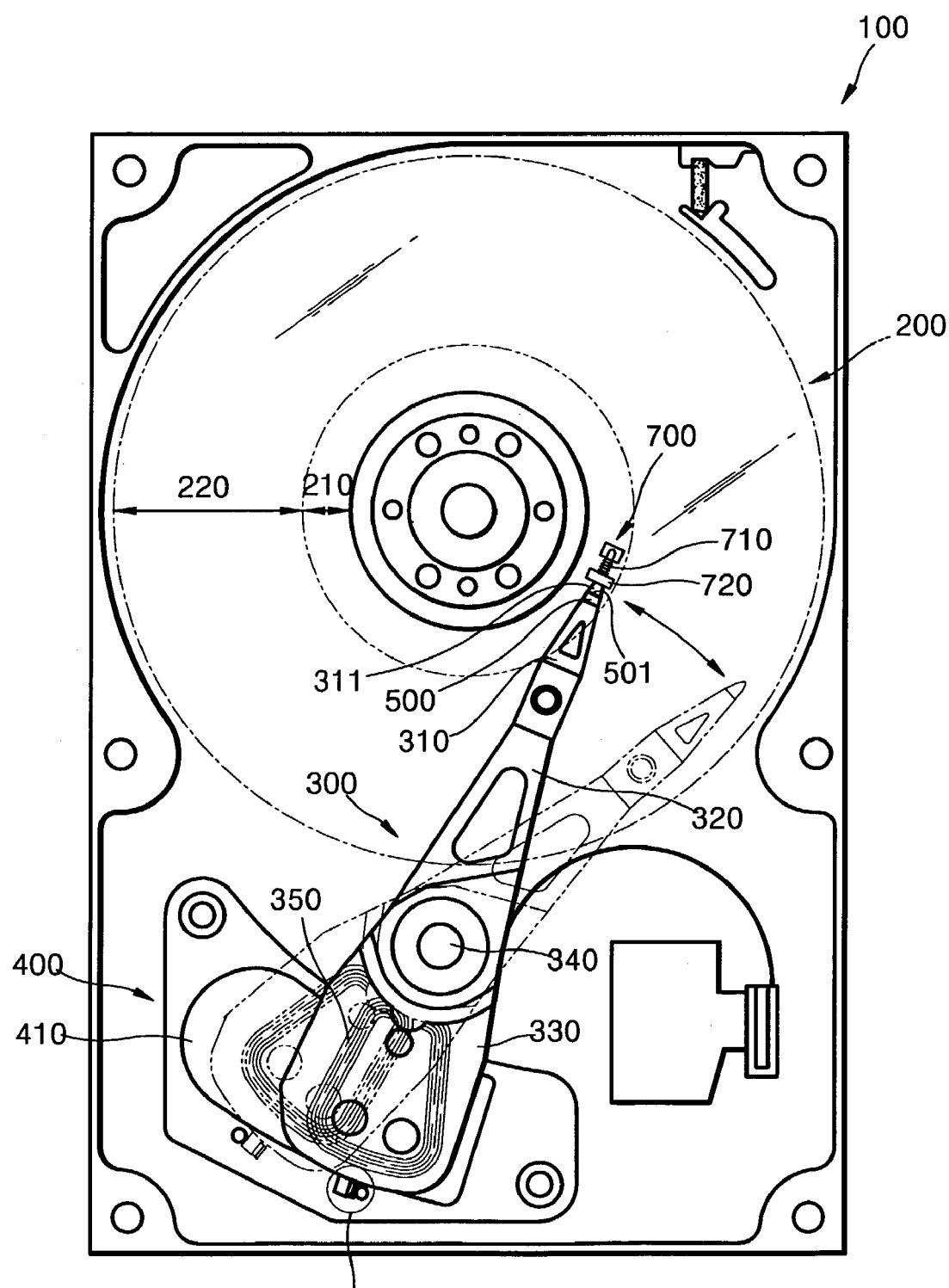
FIGS. 5A and 5B are views showing a hard disk drive adopting a magnetic head parking apparatus according to an embodiment of the present invention.
Figure 5B:
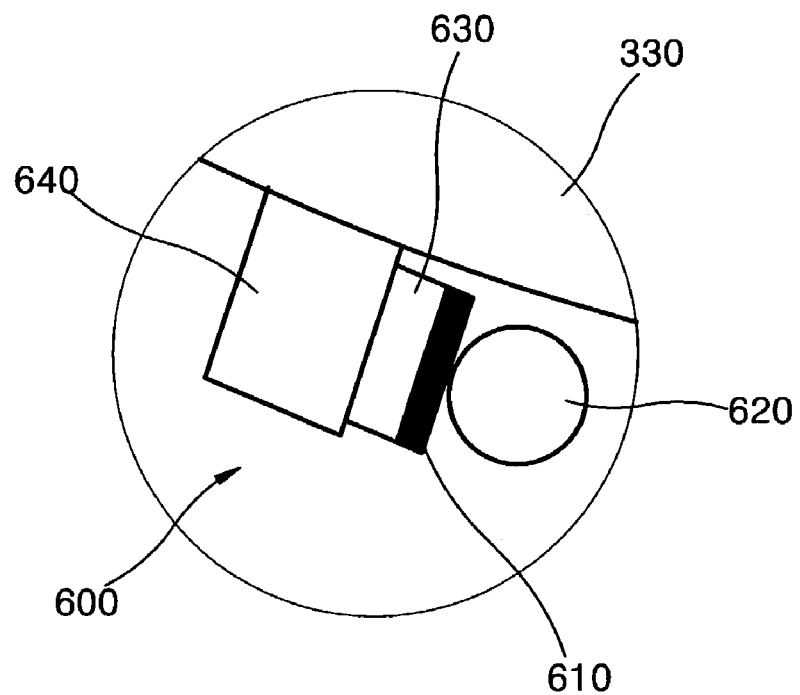

FIGS. 5A through 9 show a hard disk drive having a magnetic head parking apparatus according to an embodiment the present invention. Referring to FIGS. 5A and 5B, the hard disk drive having the magnetic head parking apparatus includes a base 100, a hard disk 200 where predetermined information is recorded, and an actuator 300, on which a magnetic head 501 for recording and reproducing the information on and from the hard disk 200 is mounted, rotating around a rotation shaft 340 provided on the base 100. The actuator 300 includes an arm 320 coupled to the rotation shaft 340 to be capable of pivoting, a suspension 310 installed at the arm 320 and supporting a slider 500 where the magnetic head 501 is mounted to be elastically biased in a direction to closely contact the hard disk 200, and a bobbin portion 330 around which a mobile coil 350 of a voice coil motor is wound.

An extension piece 311 interfering with a shape memory spring 700 and a parking house 720 which will be described later is formed at the suspension 310. The voice coil motor includes the mobile coil 350 and a magnet 410 installed at a yoke 400, e.g., upper and lower yokes, installed on the base 100 and generating a magnetic force. The upper and lower yokes 400 and the magnets 410 are arranged in a pair above and below the actuator 300, respectively, to face each other. A locking unit 600 is used for locking the actuator 300 not to move after the slider 500 is disposed in a parking area 210 of the hard disk 200. The locking unit 600 includes a magnetic member 620 installed at the yoke 400 and magnetized by the magnet 410, a damper 630 inserted in a coupling protrusion 640 provided at one end of a bobbin portion 330 of the actuator 300, and an iron piece 610 coupled to an end portion of the damper 630.

Figure 6:
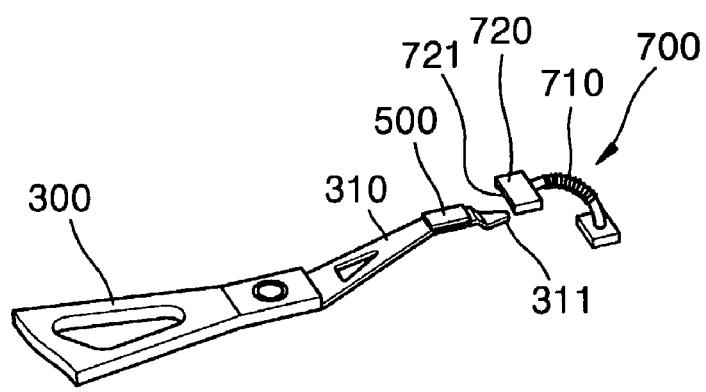
FIGS. 6 and 7 are views showing a parking release state of the magnetic head parking apparatus of FIG. 5A.
Figure 7:
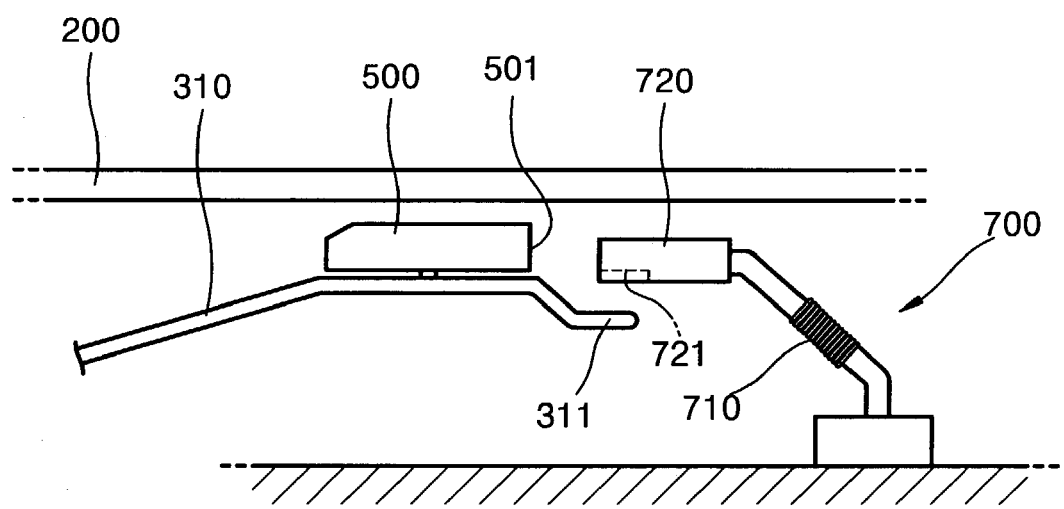
Figure 8:
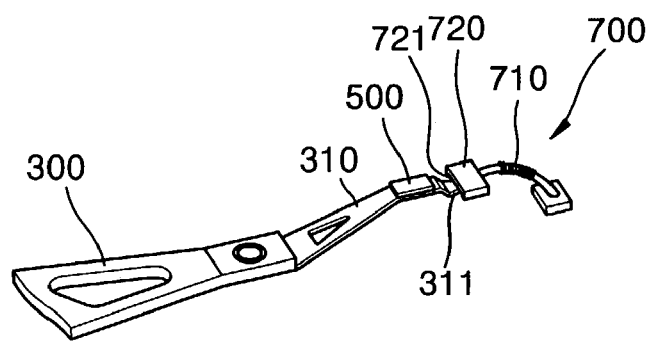
FIGS. 8 and 9 are views showing a parking state of the magnetic head parking apparatus of FIG. 5A.
Figure 9:
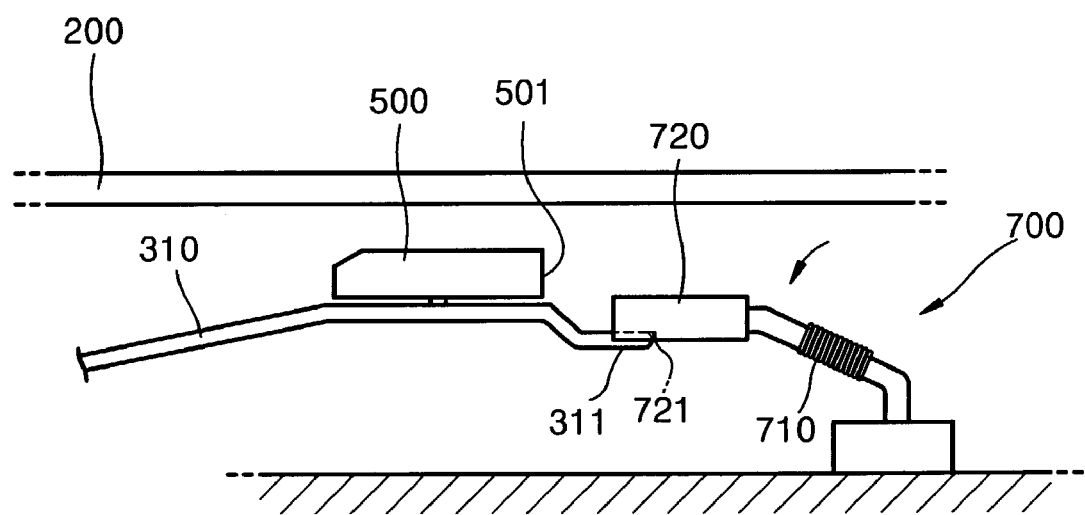

The shape memory spring 700 around which a coil 710 is wound is installed at a position near the parking area 210 of the hard disk 200 as a deformation member which is reversibly deformable. When current is supplied to the coil 710, the shape memory spring 700 is heated and deformed such that the extension piece 311 does not interfere with the parking housing 720 as shown in FIGS. 6 and 7. When the current is cut off as shown in FIGS. 8 and 9, the shape memory spring 700 is cooled and deformed such that the parking housing 720 presses the extension piece 311 in a direction in which the slider 500 is separated from the hard disk 200.

A bi-directional shape memory device which is reversibly deformable according to temperature, for example, a bi-directional shape memory device adopted in an air vent adjustment plate of a coffee maker, is used as the shape memory spring 700. Although the current supplied to the coil 710 may use a separate electrical power, it is possible to use a back electromotive force of a motor (not shown) rotating the disk 200 in view of energy saving. That is, as current generating by the motor back electromotive force is supplied to the coil 710 when the disk 200 is driven, electrical power consumption can be reduced.

In the above structure, when the hard disk 200 stops rotating, for example, the electrical power is turned off, an electromagnetic force is generated by an interaction between the current flowing through the mobile coil 350 and the magnetic force generated by the magnet 410. Accordingly, as shown in FIG. 5A, the actuator 300 pivots so that the slider 500 having the magnetic head 501 mounted thereon enters the parking area 210. Here, the magnetic member 620 and the iron piece 610 of the locking unit 600 are magnetically coupled to each other so that the actuator 300 is locked not to move. When the hard disk 200 stops rotating, the current flowing through the coil 710 wound around the shape memory spring 700 is cut off before the slider 500 enters the parking area 210.

In the present invention, it is assumed that the current is supplied to the coil 710 by the back electromotive force of the hard disk 200. Thus, as the hard disk 200 stops rotating, the current flowing through the coil 710 is cut off accordingly. Then, the shape memory spring 700 is gradually cooled and deformed as shown in FIGS. 8 and 9. Here, the parking housing 720 presses the extension piece 311 of the suspension 310 entering the parking area 210 so that the slider 500 is separated from the disk 200. Here, the extension piece 311 is safely received (disposed) in an accommodation groove 721 formed in the parking housing 720. Thus, even when the hard disk 200 stops rotating, the slider 500 does not contact the hard disk 200 because the extension piece 311 is interfered by the parking housing 720, so that a parking state is maintained.

Next, when the hard disk 20 is reused, the hard disk 200 is rotated again, and the current flows through coil 710. Then, as the shape memory spring 700 is heated, the extension piece 311 and the parking housing 720 return to respective original positions in which they are not interfered. However, even when the shape memory spring 700 returns to an original shape, since the hard disk 200 is rotating, the lift force is generated, so that the slider 500 does not collide with the hard disk 200. In this state, the electromagnetic force is generated by the interaction between the current flowing through the mobile coil 350 and the magnetic force generated by the magnet 410 and overcomes a coupling force between the magnetic member 620 and the iron piece 610. As a result, the actuator 300 pivots as indicated by an imaginary (dotted) line of FIG. 5A. Thereafter, the slider 500 having the magnetic head 501 mounted thereon is moved in the recording area 220, and a recording and reproduction work is performed.

Figure 4:
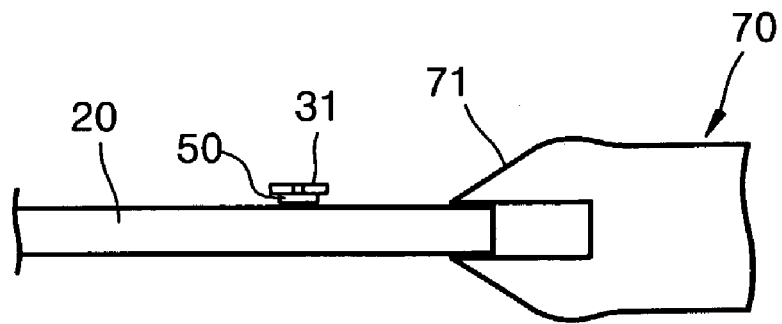

Therefore, in the above magnetic head parking apparatus, since the slider 500 does not contact the hard disk 200 and is separated therefrom during parking, the magnetic head 501 is hardly damaged by an impact between the magnetic head 501 and the hard disk 200. Also, the parking apparatus does not intrude the recording area 220. That is, when the slider 500 enters in the parking area 210 of the hard disk 200, the parking housing 720 presses the extension piece 311. Thus, compared to a conventional technology in which a ramp is installed at an outer circumferential side of the hard disk (refer to FIG. 4), the recording area 220 is used as is, without reducing a data space of the recording area 220, and more data space can be secured. In addition, according to the parking apparatus of the present invention, the parking area 210 of the hard disk 200 may be used as an additional recording area. That is, in a present structure of the hard disk drive according to the invention, since the magnetic head 501 is parked such that the slider 500 does not contact the hard disk 200 at all and is separated from the hard disk 200, the parking area 210 is not necessarily additionally formed on the hard disk 200. Also, the shape memory spring 700 can be installed at any position if the shape memory spring 700 is deformed not to interfere with the actuator 300 during recording and reproduction. Thus, the damage to the magnetic head 501 is prevented, and the data space of the hard disk 200 can be extended.

Figure 10:
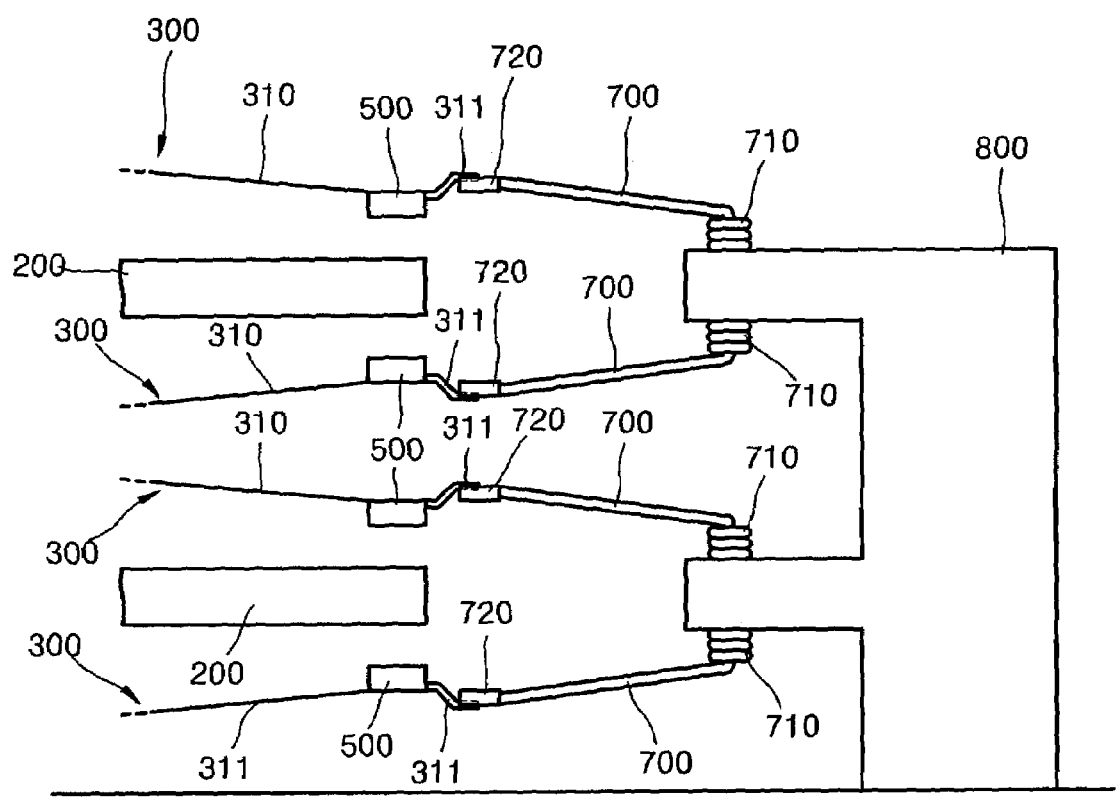
FIG. 10 is a view showing another hard disk drive having a plurality of magnetic head parking apparatuses having a plurality of hard disks stacked therein according to another embodiment of the present invention.

In the meantime, the parking apparatus of the present invention can be installed outside the hard disk. In particular, the parking apparatus can be adopted in another hard disk drive having a plurality of hard disks 200 stacked therein as shown in FIG. 10. That is, as shown in FIG. 10, a predetermined housing (frame) 800 is installed, and the parking apparatus is installed at the actuator 300 corresponding to each of surfaces of the hard disks 200 to perform a parking work. During parking, the slider 500 is disposed in an area of the hard disks 200, and only the extension piece 311 protrudes from the area of the hard disks 200. In this state, the parking housing 720 lifts the extension piece 311 from the hard disk 200 so that the parking apparatus does not intrude the disc area.

As described above, in the magnetic head parking apparatus of the hard disk drive according to the present invention, since the slider is parked in a state of being separated from the hard disk, the damage to the magnetic head due to an impact can be reduced. Also, since an additional parking area is not needed to be made in the hard disk, more data space can be secured in the hard disk.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A magnetic head parking apparatus in a hard disk drive having an actuator and a first magnetic head moving in a first direction parallel to a recording area of a first disk in a recording state, the apparatus comprising:
    a deformation member which is reversibly deformable; and
    a deformation control unit controlling the deformation member to be deformed in a second direction to separate the magnetic head from the disk in a parking state,
    wherein the deformation control unit comprises a coil wound around the deformation member and heating the deformation member which is deformable as current is supplied to the coil.

2. The apparatus as claimed in claim 1, wherein the second direction is perpendicular to the first direction.

3. The apparatus as claimed in claim 1, wherein the actuator comprises a rotation shaft and an actuator arm rotating about an axis of the rotation shaft, and the deformation member is deformed to contact a portion of the actuator arm.

4. The apparatus as claimed in claim 1, wherein the actuator comprises an actuator arm, a suspension coupled to the actuator arm, and a slider mounted on the suspension and having the magnetic head, and the deformation member is deformed to contact a portion of the suspension.

5. The apparatus as claimed in claim 4, wherein the suspension comprises an extension piece formed on the suspension, and the deformation member is deformed to contact a portion of the suspension.

6. The apparatus as claimed in claim 5, wherein the extension piece is extended from the suspension toward the deformation member.

7. The apparatus as claimed in claim 5, wherein the suspension is disposed in a third direction from a rotation shaft, and the extension piece is extended in the third direction.

8. The apparatus as claimed in claim 5, wherein the extension piece is disposed to correspond to the deformation member in the parking state while being disposed not to correspond to the deformation member in the recording state.

9. The apparatus as claimed in claim 5, wherein the magnetic head is mounted on the slider to be spaced-apart from the disk by a first distance, and the extension piece is spaced-apart from the disk by a second distance.

10. The apparatus as claimed in claim 9, wherein the second distance is greater than the first distance.

11. The apparatus as claimed in claim 5, wherein the slider comprises a portion on which the magnetic head is mounted, to be spaced-apart from the disk by a first distance, and the extension piece is spaced-apart from the disk by a second distance.

12. The apparatus as claimed in claim 11, wherein the deformation member comprises:
    a portion spaced-apart from by a third distance between the first distance and the second distance.

13. The apparatus as claimed in claim 5, wherein the deformation member comprises:
a portion disposed between the extension piece and the disk to correspond to the extension piece.

14. The apparatus as claimed in claim 5, wherein the deformation member comprises:
a portion corresponding to the extension piece and moving between the extension piece and the disk.

15. The apparatus as claimed in claim 5, wherein the hard disk drive comprises a frame corresponding to the disk, and the deformation member comprises:
a first end disposed on the frame; and
a second end extended from the first end toward a position corresponding to the extension piece.

16. The apparatus as claimed in claim 15, wherein the first end of the deformation member is not disposed on the recording area of the disk.

17. The apparatus as claimed in claim 1, wherein the disk comprises:
a parking area above which the magnetic head is parked according to deformation of the deformation member in the parking state, and on which data is recorded by the magnetic head in the recording state.

18. The apparatus as claimed in claim 17, where the deformation member comprises:
a portion contacting the actuator and disposed in the parking area to separate the magnetic head of the actuator from the parking area of the disk.

19. The apparatus as claimed in claim 1, wherein the deformation member is not disposed in the recording area.

20. The apparatus as claimed in claim 1, wherein the deformation member comprises:
a coil connected to the deformation control unit to generate a heat; and
a deformable member deformed according to the heat of the coil.

21. The apparatus as claimed in claim 1, wherein the deformation member comprises:
a first shape formed in the recording state; and
a second shape formed in the parking state.

22. The apparatus as claimed in claim 1, wherein the deformation member comprises:
a memory having a first shape formed in the recording state so that the magnetic head is in contact with the disk to record data on the recording area of the disk, and having a second shape formed in the parking state so that the magnetic head is separated from the disk.

23. The apparatus as claimed in claim 1, wherein the deformation member comprises:
a shape memory coupled to the deformation control unit and having a first shape and a second shape in response to a control of the deformation control unit.

24. The apparatus as claimed in claim 1, wherein the hard disk drive comprises a frame, the actuator comprises an extension piece, and the deformation member comprises:
a first end disposed on the frame;
a second end disposed on a position corresponding to the extension piece in the parking state; and
a deformable member formed between the first end and the second end to move the second end with respect to the first end.

25. The apparatus as claimed in claim 24, wherein the first end of the deformation member is stationary, and the second end is movable in response to a movement of the deformable member.

26. The apparatus as claimed in claim 25, wherein the magnetic head is separated from the disk in response to a movement of the second end of the deformation member.

27. The apparatus as claimed in claim 25, wherein the second end of the deformation member moves in the second direction, and the magnetic head moves in the second direction in response to the movement of the second end of the deformation member.

28. The apparatus as claimed in claim 25, wherein the frame is stationary, and the disk is rotatable with respect to the frame.

29. The apparatus as claimed in claim 25, wherein the second end of the deformation member moves between the frame and the disk.

30. The apparatus as claimed in claim 1, wherein the hard disk drive comprises a power source, and the deformation control unit controls the power source to be connected to or disconnected to the deformation member.

31. The apparatus as claimed in claim 30, wherein the hard disk drive comprises a motor rotating the disk, and the motor is used as the power source.

32. The apparatus as claimed in claim 31, wherein the motor generates a back electromotive force generating the current, and the deformation member is deformable according to the current.

33. The apparatus as claimed in claim 1, wherein the hard disk drive comprises a second disk and a second actuator arm with a second magnetic head, and the deformation member comprises a first deformation part disposed to correspond to the first disk and a second deformation part disposed to correspond to the second disk, and the deformation control unit controls the first deformation part to separate the first magnetic head from the first disk in the parking state and the second deformation part to separate the second magnetic head from the second disk in the parking state.

34. A magnetic head parking apparatus of a hard disk drive for parking a magnetic head installed on an actuator, the apparatus comprising:
a deformation member reversibly deformable in a direction in which the magnetic head is separated from a disk by pressing one side of the actuator; and
a deformation control unit controlling deformation of the deformation member such that during parking the magnetic head, the deformation member is deformed in the direction in which the magnetic head is separated from the disks,
wherein the deformation control unit comprises a coil wound around the deformation member and heating the deformation member which is deformable as current is supplied to the coil.

35. The apparatus as claimed in claim 34, wherein the deformation member comprises:
a shape memory spring reversibly deformable according to temperature.

36. The apparatus as claimed in claim 34, wherein the hard disk drive comprises a motor rotating the disk and generating a back electromotive force, and the current applied to the coil uses the back electromotive force of the motor.

37. A magnetic head parking apparatus of a hard disk drive for parking a magnetic head installed on an actuator, the apparatus comprising:
a deformation member reversibly deformable in a direction in which the magnetic head is separated from a disk by pressing one side of the actuator; and a deformation control unit controlling deformation of the deformation member such that during parking the magnetic head, the deformation member is deformed in the direction in which the magnetic head is separated from the disk, wherein the actuator comprises:
  a rotation arm;
  a slider having the magnetic head mounted thereon; and
  a suspension having a first end fixed to the rotation arm and a second end supporting the slider to be elastically biased toward the disk, and
the deformation member presses the second end of the suspension, and
wherein the suspension comprises an extension piece provided at the second end of the suspension, the deformation member comprises a parking housing, an accommodation groove formed on the parking housing accommodating the extension piece, and the parking housing presses the extension piece according to deformation of the deformation member.

* * * * *

UNITED STATES PATENT AND TRADEMARK OFFICE
CERTIFICATE OF CORRECTION

PATENT NO. : 7,035,052 B2
APPLICATION NO. : 10/388421
DATED : April 25, 2006
INVENTOR(S) : Do-wan Kim It is certified that error appears in the above-identified patent and that said Letters Patent is hereby corrected as shown below:

Column 7, Line 24, change "where" to --wherein--.

Column 8, Line 47, change "disks" to --disk--.

Signed and Sealed this

Twenty-sixth Day of December, 2006

JON W. DUDAS
*Director of the United States Patent and Trademark Office*